United States Patent
McGuire et al.

(10) Patent No.: US 8,321,974 B2
(45) Date of Patent: Dec. 4, 2012

(54) INSULATING CONSTRUCTION HAVING A MULTI-LAYER SYNTHETIC CODE

(75) Inventors: Michael Scott McGuire, Mammoth Lakes, CA (US); Andrew Gustafson, Sacramento, CA (US); James Jacobson, Oakland, CA (US)

(73) Assignee: The North Face Apparel Corp., Wilmington, DE (US)

( * ) Notice: Subject to any disclaimer, the term of this patent is extended or adjusted under 35 U.S.C. 154(b) by 22 days.

(21) Appl. No.: 12/910,157

(22) Filed: Oct. 22, 2010

(65) Prior Publication Data

US 2012/0096641 A1    Apr. 26, 2012

(51) Int. Cl.
*A47G 9/08* (2006.01)
(52) U.S. Cl. .................. 5/413 R; 5/417; 5/420
(58) Field of Classification Search .......... 5/413 R, 5/417, 420
See application file for complete search history.

(56) References Cited

U.S. PATENT DOCUMENTS

| | | | |
|---|---|---|---|
| 3,959,834 A * | 6/1976 | Hunt | 5/413 R |
| 4,513,461 A * | 4/1985 | Tardivel | 5/413 R |
| 4,884,303 A | 12/1989 | Scherer | |
| 4,910,055 A * | 3/1990 | Wigutow | 428/36.1 |
| 5,033,135 A * | 7/1991 | Creek | 5/413 R |
| 5,657,497 A * | 8/1997 | Howe | 5/413 R |
| 5,960,492 A * | 10/1999 | Byrne | 5/413 R |
| 5,966,756 A * | 10/1999 | Cartier | 5/413 R |
| 6,018,830 A * | 2/2000 | Howe | 5/413 R |
| 6,338,173 B1 | 1/2002 | Ramsey | |
| 6,449,787 B1 | 9/2002 | Thorne | |
| 2004/0040087 A1* | 3/2004 | Lack et al. | 5/413 AM |
| 2006/0185085 A1* | 8/2006 | Brenner et al. | 5/413 R |
| 2007/0136946 A1 | 6/2007 | Haislip | |

* cited by examiner

*Primary Examiner* — William Kelleher
(74) *Attorney, Agent, or Firm* — Kenyon & Kenyon LLP

(57) ABSTRACT

An insulating construction having a multi-layer synthetic core for use in products such as sleeping bags is provided. A sleeping bag using this construction may include a synthetic core having first and second layers, an inner lining adjacent to the first layer, and an outer shell adjacent to the second layer. The synthetic core may be contained within the inner lining and outer shell. The first layer may be constructed of a first material having a first denier; and the second layer may be constructed of a second material having a second denier larger than the first denier. The inner liner may define an inner space configured to accommodate a human body. Various other products made from this construction, such as jackets, pants, and other garments, are also provided.

17 Claims, 5 Drawing Sheets

INSULATING CONSTRUCTION HAVING A MULTI-LAYER SYNTHETIC CODE

TECHNICAL FIELD

The present invention generally relates to an insulating construction having a multi-layer synthetic core for use in a wide range of products, such as sleeping bags, garments, and the like.

BACKGROUND

Insulating constructions for use in outdoor products (such as sleeping bags) and apparel (such as gloves, jackets, undergarments, trousers, and other clothing) are known. In the case of sleeping bags for example, many designs feature insulating layers constructed of a high-denier material designed to increase thermal resistance by creating air pockets around the material's fibers. However, while such constructions provide insulation from cold environments, their use of high-denier material does not sufficiently reflect radiant body heat back to a user, which results in lower overall thermal efficiency.

Accordingly, there is a need for an insulating construction with improved radiant heat reflectivity.

SUMMARY

The present invention relates to sleeping bags made of an insulating construction. One such sleeping bag includes a synthetic core having first and second layers, an inner lining located adjacent to the first layer, and an outer shell located adjacent to the second layer. The synthetic core may be contained within the inner lining and outer shell. The first layer may be constructed of a first material having a first denier, while the second layer may be constructed of a second material having a second denier greater than the first denier. The inner liner may define an inner space configured to accommodate a human body. The first layer may be located closer to the inner space than the second layer. In another, more specific example, the first material has a denier of about 2 denier or less, and the second material has a denier of about 2.5-5 denier.

The present invention also generally relates to insulating constructions having multi-layer synthetic cores. One such insulating construction includes a synthetic core having first and second layers, an inner lining located adjacent to the first layer, and an outer shell located adjacent to the second layer. The synthetic core may be contained within the inner lining and outer shell. The first layer may be constructed of a first material having a first denier, while the second layer may be constructed of a second material having a second denier greater than the first denier.

Thus, one example of the present invention improves upon typical insulation constructions by employing a finer denier material closer to an inner side, where a human body (or other warm object) may be located. Accordingly, this fine-denier material will have a much greater radiant heat reflectivity than a lager denier/high loft material. A second layer, which may be made from a large-denier material, is arranged on a side of the first layer opposing the inner-facing side. By combining the two in this way, superior radiant heat reflection can be achieved while still maintaining the insulation advantages of larger denier materials.

The invention may be embodied in numerous products, such as sleeping bags, garments, and the like. The following detailed description, taken in conjunction with the referenced drawings, discloses examples of the invention.

BRIEF DESCRIPTION OF THE DRAWINGS

The present invention will become more fully understood from the detailed description given below and from the accompanying drawings. The drawings are intended to disclose but a few possible examples of the present invention, and thus do not limit the present invention's scope.

DETAILED DESCRIPTION

The present invention generally relates to insulating constructions having multi-layer synthetic cores. While a preferred example of a sleeping bag is described in detail below, a construction in accordance with the present invention may be used in a broad range of products, such as outdoor gear, as well as gloves, jackets, shirts, pants, undergarments, hats, boots, and other apparel. Further, the construction may be employed in items such as pillows, sheets, comforters, and the like. Additionally, the construction may be used as an insulation for any warm item or object that gives off heat. As such, a construction of the present invention may also be employed by the food service industry or similar fields for use in constructing apparatuses that keep hot items at a proper temperature during transport or storage.

Figure 1A:
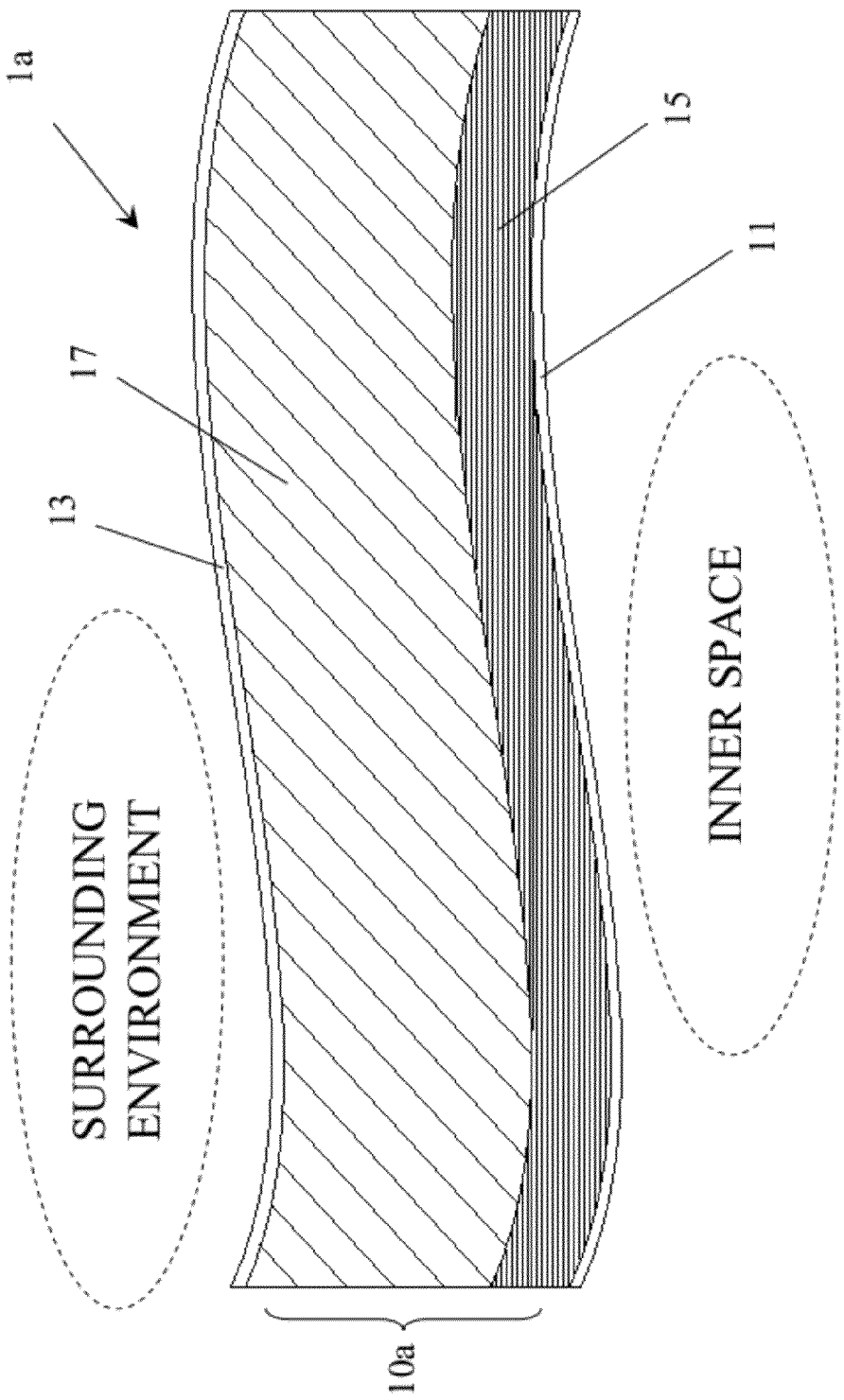
FIG. 1A shows one example of an insulating construction having a multi-layer synthetic core.

One example of an insulating construction in accordance with the present invention is shown in FIG. 1A. This example construction 1a includes a synthetic core 10a, an inner lining 11, and an outer shell 13. Synthetic core 10a has a first core layer 15 and a second core layer 17. Inner lining 11 may have an outer surface exposed to an inner space. Preferably, a surface of inner lining 11 abuts to or faces a hot object or body (such as a human body) contained within the inner space, such that inner lining 11 is closer to the body than outer shell 13. The outer surface of outer shell 13 may be exposed to a surrounding environment Inner lining 11 and outer shell 13 surround and enclose synthetic core 10a, which is formed of first layer 15 and second layer 17.

In order to achieve more effective insulation, first layer 15 is preferably made from a first material having a relatively fine denier. In one example, first layer 15 may be made from a material of 2 denier or less, or of about 0.8 denier to 2.5 denier. In another example, the fibers that make up the material of layer 15 may have an outer diameter of about 9-20 microns. First layer 15 may be of any desired thickness and need not be thinner than second layer 17 as shown in FIG. 1A. The first layer of the synthetic core has a greater radiant heat reflectivity and is generally most effective when placed a relatively short distance from a hot body or object. One example of a first core layer may be generally characterized by relatively small fibers of a fine denier, forming a relatively dense sheet. Non-limiting examples of suitable materials for the first core layer include Apex® (available from HarVest Consumer Insulation, Inc.), synthetic or semi-synthetic materials such as polyester, nylon (polyamide), rayon, polytetrafluoroethylene (PTFE), and materials containing polyethylene and/or polyurethane fibers. Natural fibers may also be used, including but not limited to down, cotton, wool, flax, and bamboo.

In contrast, second layer 17 is made from a second material having a larger denier than that of the first material. In one example, second layer 17 may be made from a material of about 2.5-5 denier. In another example, the fibers that make up the material of second layer 17 may have an outer diameter of about 18-26 microns. Second layer 17 may be of any desired thickness and need not be thicker than first layer 15 as shown in FIG. 1A. The second layer of the synthetic core may have more air space between fibers than the first core, thus providing better insulation but having a lower radiant heat reflectivity. Non-limiting examples of suitable materials for the second core layer include Prism® (available from HarVest Consumer Insulation, Inc.), synthetic or semi-synthetic materials such as polyester, nylon (polyamide), rayon, PTFE, and materials containing polyethylene and/or polyurethane fibers. Natural fibers may also be used, including but not limited to down, cotton, wool, flax, and bamboo.

The arrangement of the core layers as described above preferably creates a layer closer to a warm object that has a low-volume air space that effectively reflects radiant heat from the object back on itself. A layer further from the warm object has a large-volume air space, providing effective insulation.

The difference between the denier of the first and second layers need not be great, so long as it is notable. For example, in one exemplary embodiment, the first layer has a denier of about 2.5, while the second layer has a denier of about 3.5. In another example, the first layer has a denier of about 0.8, while the second layer has a denier of 4. Similarly, the difference between the fiber size of the first and second layers need not be great. In one example, both layers may be made from a material whose fibers have an outer diameter of about 17-23 microns.

First layer 15 and second layer 17 may also have deniers of a predetermined proportional difference. For example, the denier of the material of second layer 17 may be twice that of the material of first layer 15. As another example, the denier of second layer 17 may be five times the denier of first layer 15. This proportional difference may also exist between the diameter of the fibers used in the materials of the first and second layers. While various ranges have been specified for the deniers of the first and second core layers, these ranges are but a few examples of suitable values. A construction in accordance with the present invention may have layers of any denier or fiber diameter, so long as there is a notable difference in this quantity between each layer.

Figure 2:
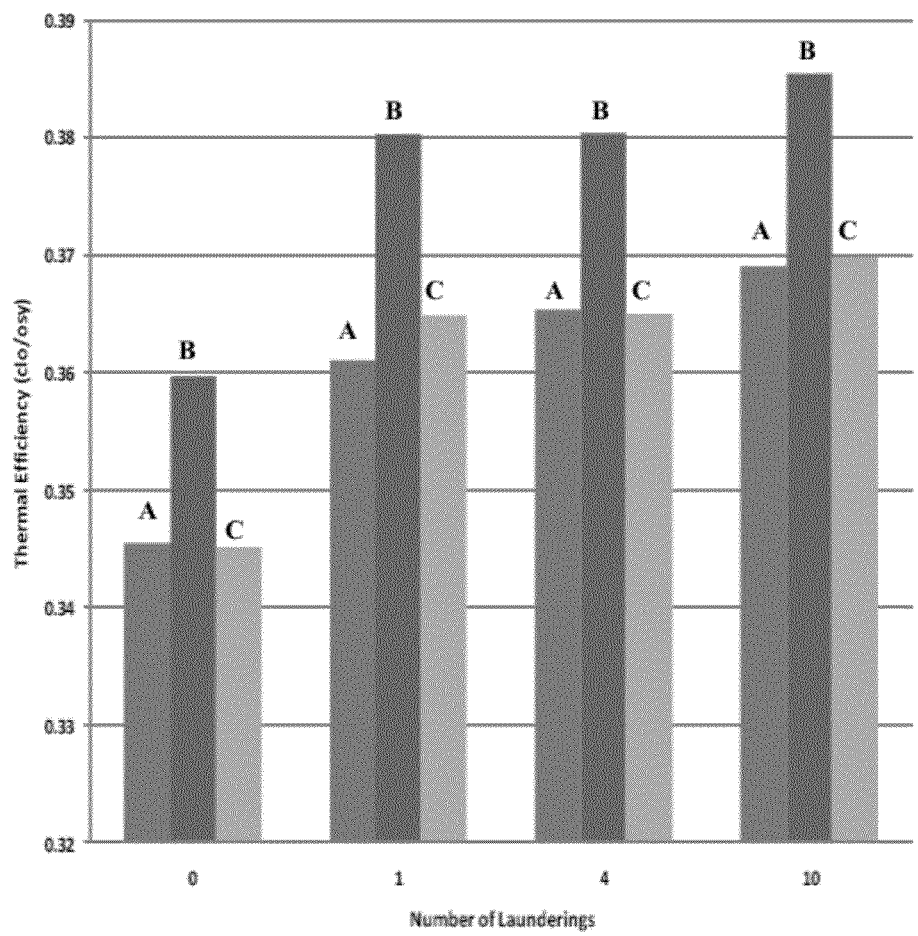
FIG. 2 shows experimental results obtained during hot plate testing of an example construction in accordance with certain embodiments of the present invention.

After conducting numerous experiments, the above-named inventors determined that the arrangements above (finer denier material closer to a body, larger denier material farther from the body) improve the overall thermal efficiency of synthetic insulation cores. In one case, such an arrangement was found to have a 5% greater thermal efficiency in hot plate testing when compared to a single-layer core or a multi-layer core with a reversed arrangement. More specifically, as shown in FIG. 2, a dual-layer insulating core construction having a first (inner/closest to skin) layer of 2.5 denier and a second (outer/farther from skin) layer of 3.5 denier achieved a greater thermal efficiency than other constructions, both before and after numerous launderings. In particular, when normalized for basis weight, construction B had a significantly greater thermal efficiency than a single, 3.5 denier-layer construction (construction A). Construction B also had a greater thermal efficiency than construction C (a "reversed" construction), in which the first (inner) layer had a denier of 3.5 and the second (outer) layer had a denier of 2.5. These results were experimentally determined during hot-plate testing of pillows.

Figure 1B:
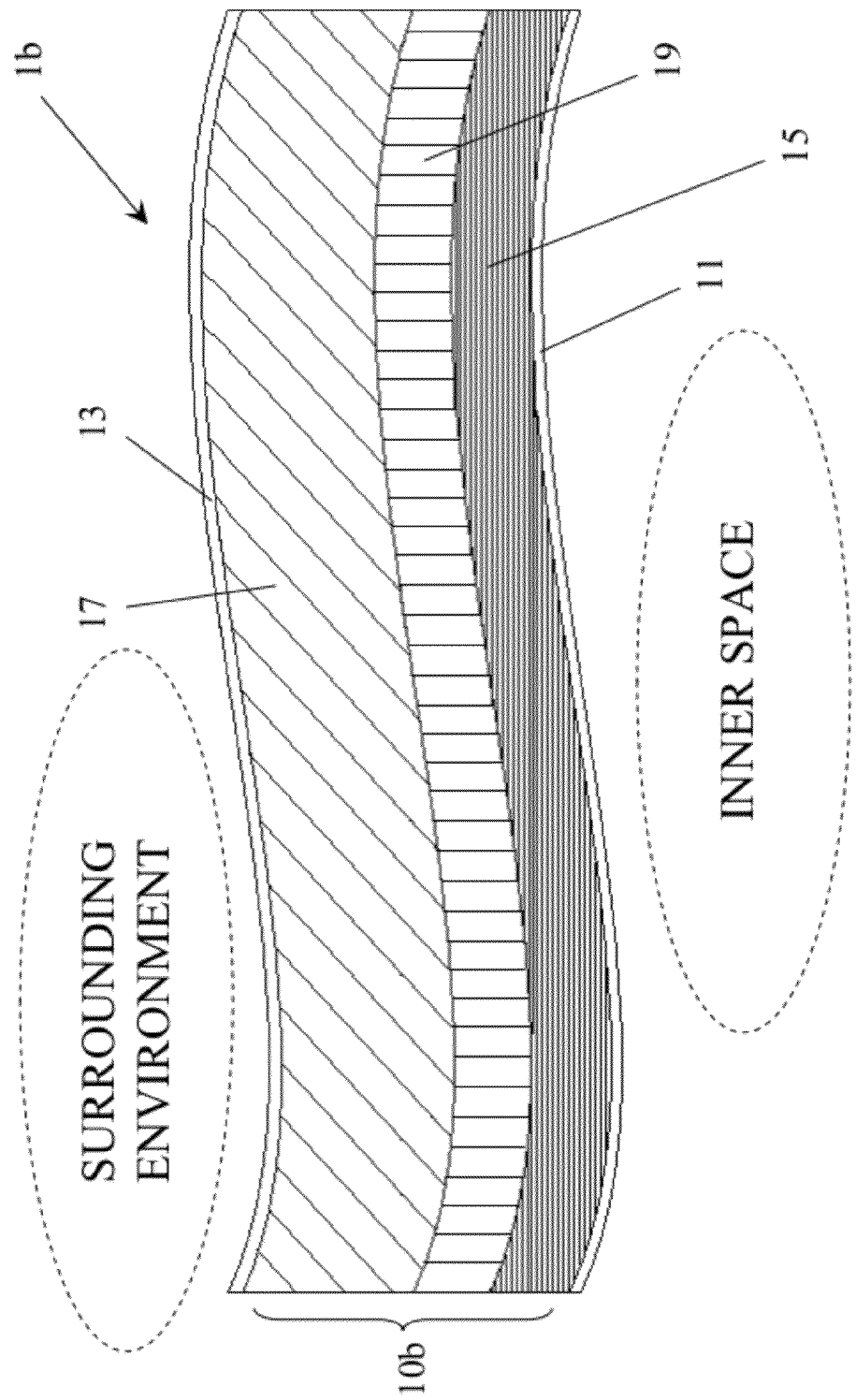
FIG. 1B shows a second example of an insulating construction having a three-layer synthetic core in accordance with certain embodiments of the present invention.

The construction described above is not limited to a two-layer synthetic core. Rather, a construction in accordance with certain embodiments of the present invention may have a core of three or more layers. For example, as shown in FIG. 1B, an insulating construction 1b has a synthetic core 10b made up of first layer 15, second layer 17, and a third layer 19 disposed therebetween. Third layer 19 may have a denier larger than first layer 15 but finer than second layer 17. Any number of layers may be used in this way to form a synthetic core. Preferably, the denier of each layer increases as the distance from the inner space (e.g., where a body or other warm object would be) increases. In other words, layers closer to a surrounding environment (outer layers) will have larger deniers than layers farther from the surrounding environment (inner layers). Similarly, outer layers may have fibers of a larger diameter than fibers of inner layers. A synthetic core in accordance with the present invention may have any number of layers based on this arrangement of different deniers based on distance from a hot object or body contained within the construction.

The various layers that make up the synthetic core may be attached to each other (or the inner lining/outer shell), such as by sewing or other methods known to those of skill in the art for connecting fabrics. However, they need not be attached; the layers may be separate from one another and/or from the inner lining/outer shell. In certain embodiments, a space may exist between the various layers and/or the lining and shell. The layers, lining, and shell may also vary in thickness and size as needed for a particular application.

Figure 3:
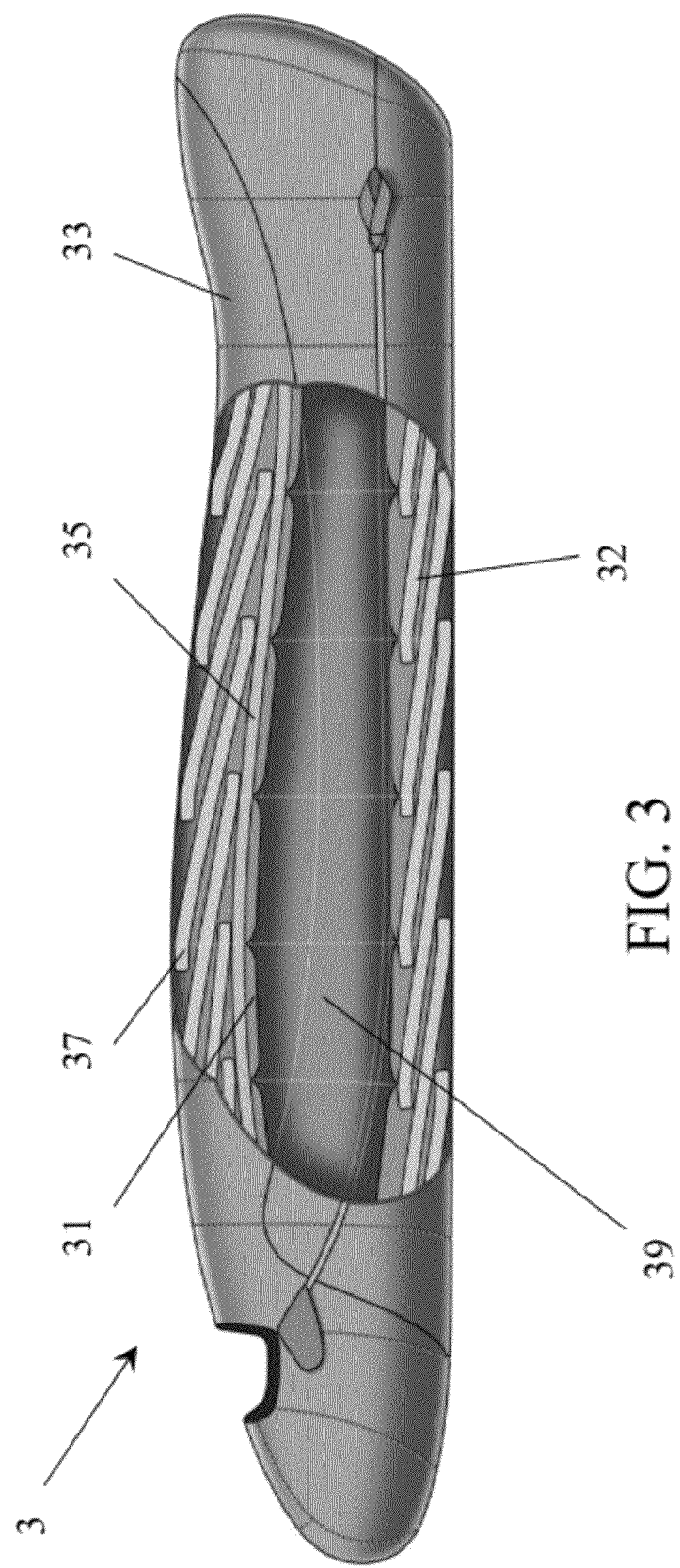
FIG. 3 shows a partial cutaway view of a sleeping bag constructed from an insulating construction in accordance with certain embodiments of the present invention.

An insulating construction in accordance with the present invention may be used in a sleeping bag, such as sleeping bag 3 shown in FIG. 3. Sleeping bag 3 includes an inner lining 31 and an outer shell 33 that surround a synthetic core having a first layer 35 with a fine denier and a second layer with a larger denier and a higher loft. The second layer may be made of a plurality of insulating sheets or batts 37 arranged in an overlapping or "shingle" configuration. First layer 35 may be a solid, continuous sheet. Sleeping bag 3 also includes an inner space 39 configured to receive or to accommodate a human body. In certain embodiments, inner space 39 is configured to accommodate a specific body type, such as a child's or that of a male or female. Inner lining 31 may be cushioned or otherwise padded to provide additional comfort to a user.

Sleeping bag 3 provides enhanced thermal efficiency in layered synthetic insulation by adding a solid, continuous sheet (layer 35) of fine denier insulation to the synthetic core. This extra layer, provided near to a user's body, reflects radiant heat back toward the user before passing into the second layer (shingles 37), which has a larger denier and a higher loft. The addition of first (fine-denier) layer 35 also reduces potential for convective air current inside sleeping bag 3. As explained above, in one example using a 2.5 denier first layer and a 3.5 denier second layer, an experimentally determined thermal efficiency improvement of approximately 5% was realized.

In the embodiment shown in FIG. 3, first layer 35 is included only on a top portion of sleeping bag 3. However, this need not be the case in all embodiments. For example, the first (fine-denier) layer may be included on the sides or bottom of a sleeping bag as well. Preferably, a first (fine-denier) layer is provided on the top and sides of a sleeping bag. Bag 3 may also include a plurality of insulating sheets or batts 32 on a bottom surface in a shingled configuration similar to batts 37. The second layer is preferably provided on top, bottom, and side portions of sleeping bag 3.

Although depicted in FIG. 3 as such, the second (large-denier) layer need not be formed of a plurality of overlapping shingles. For example, the second layer may also be a continuous sheet, similar to first layer 35 shown in FIG. 3.

A sleeping bag made from an insulated construction in accordance with the present invention may be mapped to a human body. The bag may also take the "mummy" shape shown in FIG. 3. However it is not limited to this shape, and other non-limiting examples of suitable shapes include rectangular and tapered. A bag in accordance with certain embodiments of the present invention may also include zippers, zipper-pulls, hanging loops for hanging/drying the bag, pockets for storing items, hoods, draft collars, and other features commonly found in sleeping bags.

Preferably, the synthetic core used in sleeping bags in accordance with the present invention is fixed within (i.e. non-removably attached to) the bag. Alternatively, the core may be removable and the sleeping bag configured to receive a plurality of removable cores rated for various temperatures/conditions.

Figure 4:
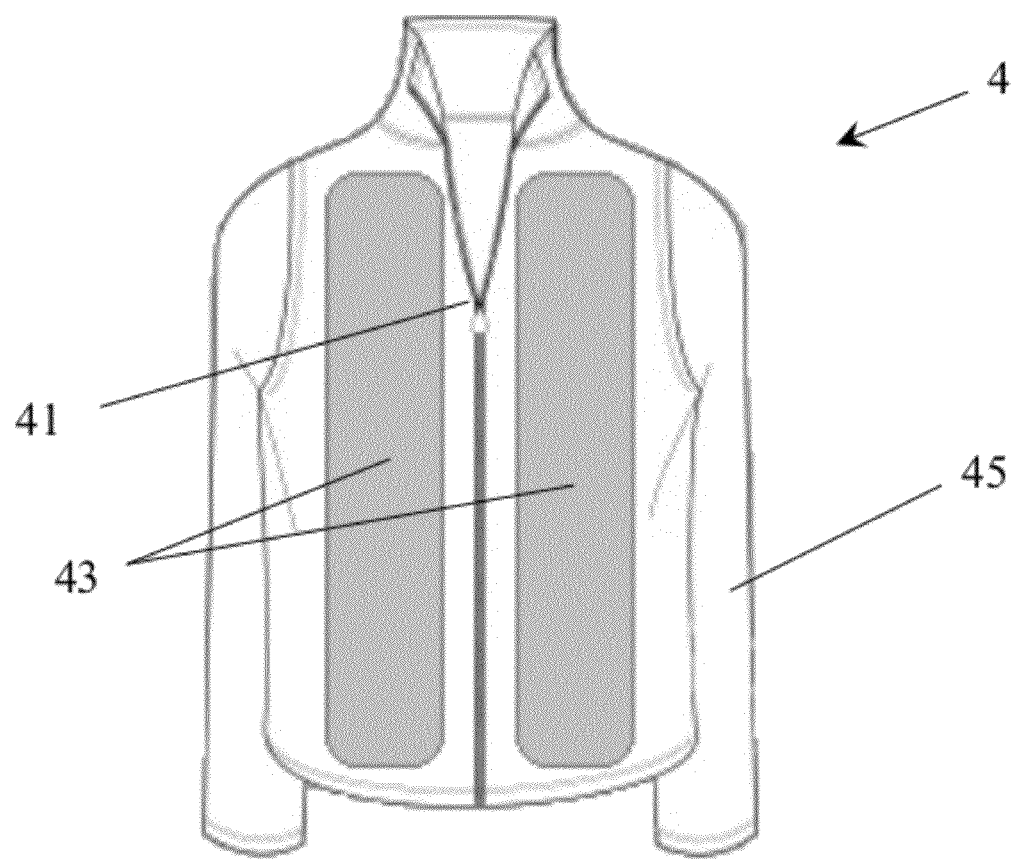
FIG. 4 shows a jacket constructed from an insulating construction in accordance with certain embodiments of the present invention.

An insulating construction in accordance with the present invention may also be used in various forms of garments, apparel or other clothing, such as a jacket. This insulation construction is not limited to symmetry in a jacket, but may be location-specific based on body-mapped heat retention needs. As shown in FIG. 4 for example, a chest portion 41 of a jacket 4 may include an insulating construction 43 to improve warmth, while sleeves 45 and a back portion (not shown) may be made of a single layer to improve heat dissipation (such as during high aerobic activities). Other items, such as hats, gloves, pants, shirts, etc., may also be designed based on this principle.

The inner lining and outer shell of the present invention may be made from any suitable material, including those made of natural and synthetic fibers. Examples of suitable materials include, but are not limited to, the following: nylon, polyester, DryLoft® (available from W. I. Gore), PTFE, breathable materials such as HyVent® (available from The North Face Inc.), canvas, cotton, wool, fleece, silk, flannel, rubber, microfiber, flax, bamboo, and gossamer. The lining and shell may also be constructed of recycled materials. Further, the liner or shell may be made from any of the materials listed above as being suitable for the core layers. The material may vary depending on the particular application.

The various layers making up the synthetic core may be made from any material having a suitable denier and/or fiber diameter such that different deniers/fiber diameters are employed based on the layers' distance from an inner space configured to contain a warm body.

While various embodiments have been described, other embodiments are plausible. It should be understood that the foregoing descriptions of various examples of an insulating construction having a multi-layer synthetic core are not intended to be limiting, and any number of modifications, combinations, and alternatives of the examples may be employed.

The examples described herein are merely illustrative, as numerous other embodiments may be implemented without departing from the spirit and scope of the present invention. Moreover, while certain features of the invention may be described above only in the context of certain examples or configurations, these features may be exchanged, added, and removed from and between the various embodiments or configurations while remaining within the scope of the invention.

We claim:

1. A sleeping bag, comprising:
a synthetic core having first and second layers;
an inner lining located adjacent to the first layer; and
an outer shell located adjacent to the second layer,
wherein:
the synthetic core is contained within the inner lining and outer shell,
the first layer is constructed of a first material having a first denier of 2.5 or less,
the second layer is constructed of a second material having a second denier of 2.5-5 and being greater than the first denier,
the inner liner defines an inner space configured to accommodate a human body, and
the first layer is located closer to the inner space than the second layer, and
wherein the first layer has a greater radiant heat reflectivity than the second layer, and
wherein the first and second deniers are not equal to one another.

2. The sleeping bag of claim 1, wherein the second denier is twice the first denier.

3. The sleeping bag of claim 1, wherein the second denier is five times the first denier.

4. The sleeping bag of claim 1, wherein the first material comprises fibers having an outer diameter of about 9-20 microns, and wherein the second material comprises fibers having an outer diameter of about 18-26 microns.

5. The sleeping bag of claim 1, further comprising a third layer located between the first and second layers, the third layer being constructed of a third material having a third denier greater than the first denier but less than the second denier.

6. The sleeping bag of claim 1, wherein the second layer comprises a plurality of insulating batts arranged in an overlapping configuration, and the first layer is a continuous sheet.

7. The sleeping bag of claim 1, wherein the first layer is provided only on a top portion of the sleeping bag.

8. The sleeping bag of claim 1, wherein the first layer is provided only on a top portion and side portions of a sleeping bag.

9. The sleeping bag of claim 1, wherein the second layer is provided on top, side, and bottom portions of the sleeping bag, while the first layer is provided only on the top portion of the sleeping bag.

10. An insulating construction, comprising:
a synthetic core having first and second layers;
an inner lining located adjacent to the first layer; and
an outer shell located adjacent to the second layer,
wherein:
the synthetic core is contained within the inner lining and outer shell,
the first layer is constructed of a first material having a first denier of 2.5 or less, and
the second layer is constructed of a second material having a second denier of 2.5-5 and being greater than the first denier, and
wherein the first layer has a greater radiant heat reflectivity than the second layer, and
wherein the first and second deniers are not equal to one another.

11. The insulating construction of claim 10, wherein the first material comprises fibers having an outer diameter of about 9-20 microns, and wherein the second material comprises fibers having an outer diameter of about 18-26 microns.

12. The insulating construction of claim 10, wherein the second denier is approximately twice the first denier.

13. The insulating construction of claim 10, wherein the second denier is approximately five times the first denier.

14. The insulating construction of claim 10, further comprising a third layer located between the first and second layers, the third layer being constructed of a third material having a third denier greater than the first denier but less than the second denier.

15. A garment comprising the insulating construction of claim 10.

16. A jacket comprising the insulating construction of claim 10.

17. A pair of pants comprising the insulating construction of claim 10.

* * * * *